March 29, 1966 P. M. KENDIG ETAL 3,243,767
ELECTROACOUSTIC TRANSDUCER FOR DETECTION OF LOW LEVEL
ACOUSTIC SIGNALS OVER A BROAD FREQUENCY RANGE
Filed April 30, 1962 3 Sheets-Sheet 1

PAUL M. KENDIG
DAVID C. GREENE
*INVENTOR.*

PAUL M. KENDIG
DAVID C. GREENE
INVENTOR.

**PAUL M. KENDIG
DAVID C. GREENE**

*INVENTOR.*

United States Patent Office 3,243,767
Patented Mar. 29, 1966

3,243,767
ELECTROACOUSTIC TRANSDUCER FOR DETECTION OF LOW LEVEL ACOUSTIC SIGNALS OVER A BROAD FREQUENCY RANGE
Paul M. Kendig and David C. Greene, both of State College, Pa., assignors, by mesne assignments, to the United States of America as represented by the Secretary of the Navy
Filed Apr. 30, 1962, Ser. No. 191,383
1 Claim. (Cl. 340—10)

This invention relates to transducers and in particular to transducers adapted to operate in a medium such as water.

An object of this invention is to provide a construction of an omnidirectional transducer which has a constant free-yield voltage response over a given frequency range.

Another object of this invention is to indicate the dimensions and other parameters of a transducer which will detect the lowest possible acoustic level.

Still another object of this invention is to provide a transducer having an adjustable impedance which may be easily adjusted and matched to that of the connecting amplifier so that the highest possible signal-to-noise ratio may be obtained.

Yet another object of this invention is to provide a transducer design which may be readily assembled, efficiently usable in a water medium and which has desirable structural characteristics to withstand hydrostatic pressure.

Still another object is to provide a space within the transducer for the location of electronic gear necessary for transducer operation.

Other objects and a fuller understanding may be had by referring to the following description and claims, taken in conjunction with the accompanying drawings, in which:

Figure 1:
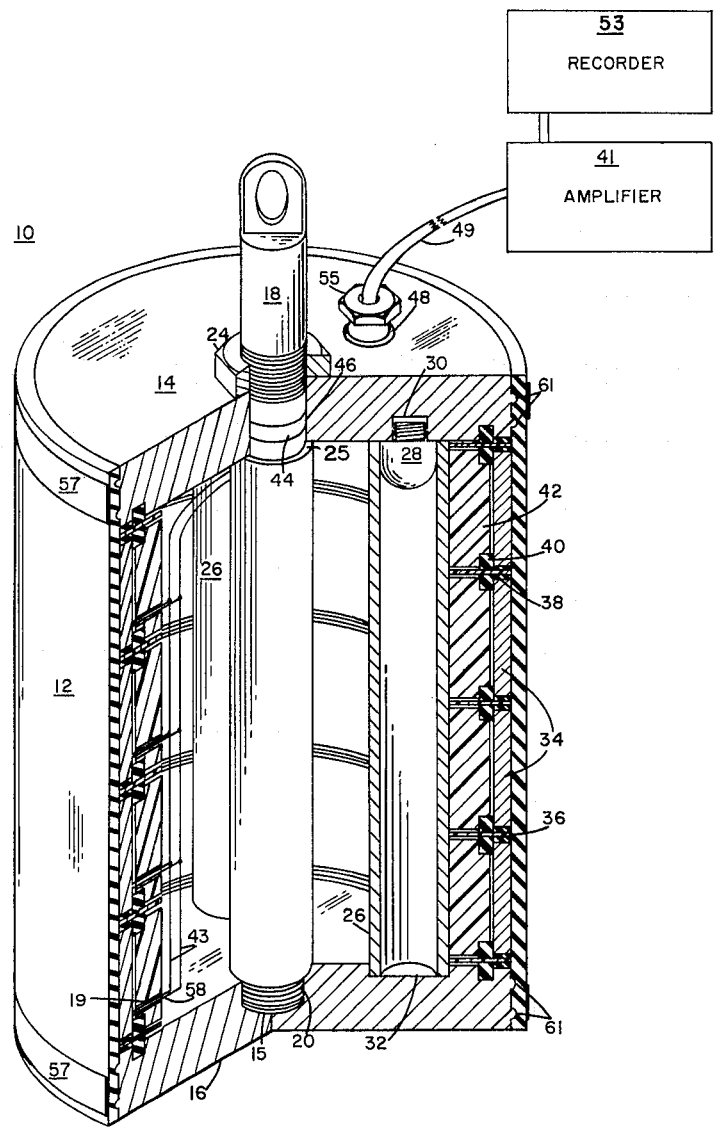
FIGURE 1 is a longitudinal sectional view of a transducer constructed in accordance with the teachings of this invention.

Referring now to the drawings wherein like reference characters designate like or corresponding parts throughout, there is shown in FIGURE 1 a transducer or hydrophone generally designated by number 10 comprised of cylindrical rubber boot 12 in which is mounted at one end, top end plate 14 and at the other end, bottom end plate 16. Center post 18 extends axially through top end plate 14, through the transducer 10 to recess 15 in the bottom of end plate 16. There it is secured in position by mating threads 20 on the bottom portion of center post 18 and recess 15, located on the inner portion of bottom end plate 16. Center post 18 is threaded adjacent to the top of end plate 14 adapted to engage the threads of nut 24 which bears against top end plate 14 forcing it against shoulder 25 formed by the larger diameter section of center post 18 which extends through transducer 10.

Three hollow support posts 26 (two are shown in FIGURE 1) are positioned within transducer 10 bearing upon the inner portion of both bottom end plate 16 and of top end plate 14. Guide stud 28 positioned in recess 30 on the inner side of top end plate 14 positions and locates support post 26 as does recess 32 on the inner side of bottom end plate 16 into which the lower portion of support post 26 fits. Piezoelectric type cylinders 34 made of a substance, such as barium titanate, are positioned concentrically within transducer 10 and in intimate contact with rubber boot 12. To provide isolation, these are separated by phenolic rings 36 and rubber support rings 38 and 40, mounted on either side of phenolic rings 36. This construction forms a secure shock proof mounting of cylinder 34. Phenolic cylinder sections 42 are concentrically positioned within the inner portion of the piezoelectric cylinder 34 but not in contact with it, and are provided with holes 19 through which electrical conductors 43 pass from connection with cylinder 34 to the inside of transducer 10. The vibration of cylinder 34 is thus unrestricted in the inner portion.

Rubber O ring 44 is mounted within recess 46 of center post 18 so that it bears against the internal surface of top end plate 14 and seals transducer 10 against water from without. Opening 48 through top end plate 14 permits the entrance of an electrical cable 49 through which electrical signals from transducer 10 are transmitted to amplifier 41, thence to recorder 53. Although amplifier 41 is shown as outside of transducer 10, it is understood that it also may be housed within the transducer together with other electrical components described below. Sealing plug 55 through which cable 49 passes is integrally fitted into opening 48 to seal both cable 49 and opening 48 from external water. Clamps 57 extend circumferentially around transducer 10 so as to bind rubber boot 12 against top end plate 14 and bottom end plate 16 to form a water tight seal. Protrusions 61, extending circumferentially around top and bottom end plates 14 and 16 are impressed into rubber boot 12 making a water tight seal.

The space within the cylinder may be used to house a pre-amplifier, calibration signal generator, switches, and batteries (not shown) to supply power to the pre-amplifier and signal generator. In one embodiment, a low frequency (as for example 200 c.p.s.) square wave generator was used. This provides signal frequencies at all the odd harmonics of 200 c.p.s. for calibrating the pre-amplifier. Signals are transmitted down the cable 49 for operating the switches that turn on and off the pre-amplifier and signal generator as desired. In this case, when acoustic signals are being detected and recorded, no electrical power is delivered from the outside.

In operation, the three support posts 26 on the inside of transducer 10 center phenolic cylinders 42 and support the end plates 14 and 16. The length of these posts 26 are such that the rubber support rings 38 are slightly compressed when the bolt on the center post is tightened to better secure the cylinder 34. The center post 18 is just slightly shorter than the three support posts 26 so that the end plates 14 and 16 rest firmly on the support posts 26 when nut 24 is tightened. Under high hydrostatic pressure, the center post 18 might support the end plates 14 and 16 if the pressure were sufficient to bend the end plates. In construction, after the parts of the hydrophone are assembled, the tight fitting rubber boot 12 is inserted over the transducer 10 in such a manner as to provide intimate airless contact between boot 12 and the piezoelectric cylinders 34.

In operation, transducer 10 provides support for extreme hydrostatic pressures, remains completely water tight and at the same time maintains its desirable omnidirectional and sensitive acoustical characteristics. As thus constructed, transducer 10 may be lowered in the water to great depths without fear of damage from hydrostatic pressure and still operate as a most effective and sensitive transducer unit.

Figure 2:
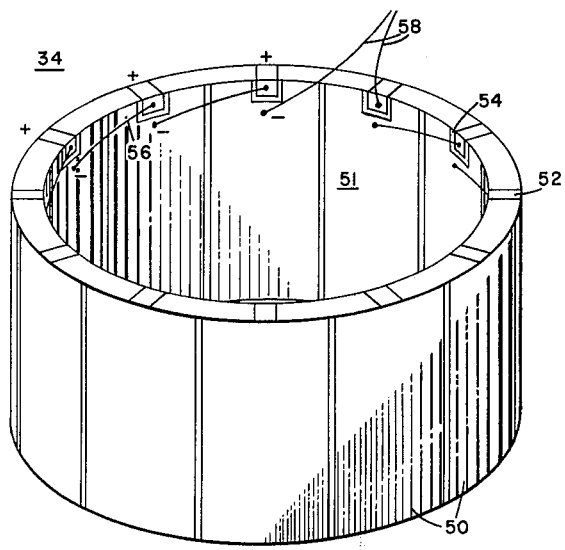
FIGURE 2 is a longitudinal view of piezoelectric cylinder, radially polarized, shown in FIGURE 1.

Referring now to FIGURE 2, cylinder 34 is composed of a piezoelectric type material such as barium titanate upon which is plated outer conducting segments 50 (of a material such as silver) on the outer surfaces and inner conducting segments 51 on the inner surfaces. Conducting tab 52, integrally attached to the outer segments 50, extends over the top and into the inner portion of cylinder 34. Recess 54 in inner segment 51 prevents conducting tab 52 from contacting inner segment 51. For best operation, cylinder 34 is radially polarized by methods well-known in the art so that segment 50 is positive and segment 51 is negative as indicated. This is usually accomplished by applying a high electrical potential of a designated polarity, say positive to the outer conducting segments 50 and a negative polarity to the inner conducting segments 51 while the cylinder is at an elevated temperature. Thus, a voltage responsive to acoustic vibration impinging on cylinders 34 appears at the tab 52 and inner segment 51.

Conductors 56 connect inner and outer segments 51 and 50 in a series-type circuit which is ultimately connected to connectors or wires 58 and thence to cable 49. Although a series-type connection is shown, it is equally possible to have a parallel one whereby all of the outer conducting segments 50 are connected together and the inner segments 51 connected together. The exact type of connection is dependent upon the desired impedance which the transducer 10 must produce in order to match the impedance of amplifier 41. A series connection such as that diagramized in FIGURE 2 will add impedances producing a higher resulting impedance whereas a parallel connection as above described will produce a lower impedance. Connectors 58 leading from cylinders 34 may likewise be connected in a series or parallel (a series connection is shown in FIGURE 1) manner with connectors 58 from the other three piezoelectric cylinders involved, depending upon the ultimate impedance desired. Hence, as may be readily seen by the variation of series or parallel connections of inner and outer segments 51 and 50 and that of cylinders 34, a wide variety of output impedance and capacitance of transducer 10 may be had. Thus, by this means, the impedance of transducer 10 may be very closely matched to that of amplifier 41 thus producing the highest possible signal-to-noise ratio.

Figure 3:
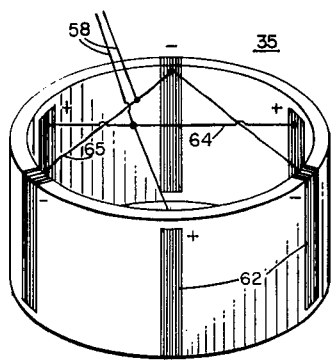
FIGURE 3 is a longitudinal view of a piezoelectric cylinder, tangentially polarized, shown in FIGURE 1.

Referring now to FIGURE 3 piezoelectric cylinder 35 is a variation of the type of cylinder 34 and may be interchanged with it. Cylinder 35 is identical in dimension to that of 34 comprised of a piezoelectric type material such as barium titanate and has conducting strip segments 62 integrally connected thereto and extending from the inner to the outer surface thereof. Cylinder 35 has been tangentially polarized, in a manner well-known in the art, as indicated by the alternate positive and negative symbols in FIGURE 3. The positive polarized segments 62 are connected by conductors 64 and the negative polarized segments 62 are connected to conductors 65. The use of a tangentially polarized cylinder, such as 35, as compared with a radially polarized one, 34, has been found to be approximately 2.7 times more sensitive due to a higher electromechanical coupling coefficient than the radial polarization when a barium titanate cylinder is used. This represents a gain of about 8.4 decibels in sensitivity with the same source impedance. Hence, transducer 10 will reflect the sensitivity gain when tangentially polarized cylinders 35 are used therein. When cylinders 35 are installed in transducer 10, connectors 58 may be connected in a series or parallel manner with the other three cylinders 35 installed. Thus, by varying the series or parallel connections of cylinders 35, the impedance of the transducer may be altered.

In practice, transducer 10 consisted of four barium titanate cylinders, each six inches in outside diameter by two inches long by 0.2 inch thick. The number of cylinders may be varied practically from one to ten; of a length of each from ½ to 6 inches and the thickness up to 1.0 inch. The thickness of the cylinder should be kept as small as possible but strong enough to withstand the outside hydrostatic pressure.

Figure 4:
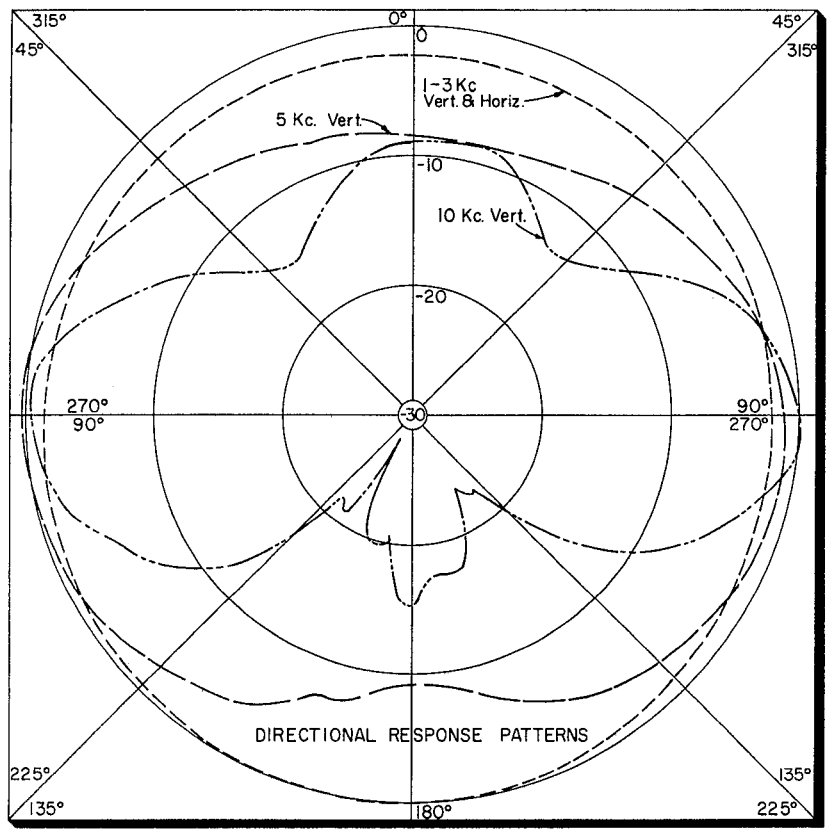
FIGURE 4 is a typical pressure distribution pattern of the transducer in FIGURE 1, taken in a plane normal to and in a plane of the axis of the transducer.

FIGURE 4 indicates the directional patterns of hydrophone 10 in planes containing the cylinder axis (vertical), and the planes normal to the axis (horizontal). Tests were conducted at frequencies of 1 kc., 3 kc., 5 kc. and 10 kc. to indicate the degree of directionality of the hydrophone 10. As may be seen in FIGURE 4, at frequencies of 3 kc. or below, the hydrophone 10 exhibited excellent omnidirectional frequency characteristics within plus or minus 1 db in both horizontal and vertical planes. The vertical patterns at 5 and 10 kc. are presented merely to show the degree of directionality occurring above 3 kc. The optimum frequency range of this configuration may be varied from 1 to 3 kc. and still maintain the desired response characteristic.

For the purpose of examining the parameters which will best give a hydrophone with omnidirectionality and flat response, consider a thin-walled hollow sphere of radius $a$ and wall thickness $b$ that is vibrating in the radial mode at a frequency well below resonance. At these frequencies, the equivalent circuit may be represented by the circuit diagram shown in FIGURE 5 where $C_0$ is the clamped capacitance, C is the motional capacitance, R is the resistance resulting from the mechanical load $R_L$, K is the stiffness, $\alpha$ is the electromechanical transformation ratio, tan $\delta$ is the loss tangent (ratio of clamped resistance to clamped reactance), and $\omega$ is the angular frequency. The purely mechanical losses will be omitted in this discussion.

At the low frequencies under consideration, the impedance is almost entirely capacitive. Indeed, from impedance considerations alone, the resistance R is perhaps the least significant; yet, as a sound projector, it is the most important because the energy delivered to this element represents the radiated acoustical energy. Therefore, the value of this element relative to the other resistive elements determines the efficiency, and hence, the equivalent noise pressure of the transducer.

Figure 5:
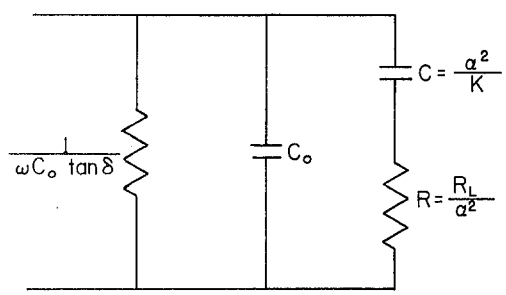
FIGURE 5 is an equivalent circuit used in the mathematical description of the operating characteristics of FIGURE 1.

Examination of the equivalent circuit of FIGURE 5 shows that the electrical input admittance is $$Y = \omega C_0 \tan \delta + j\omega C_0 + \frac{R(\omega C)^2 + j\omega C}{(R\omega C)^2 + 1}$$

and since $R\omega C \ll 1$ at these low frequencies, $$Y = \omega C_0 \tan \delta + R(\omega C)^2 + j\omega(C + C_0)$$

Again, since $\omega(C+C_0) \gg [\omega C_0 \tan \delta + R(\omega C)^2]$, $$R_T = Z_{real} = \frac{\omega C_0 \tan \delta + R(\omega C)^2}{\omega^2 (C+C_0)^2} \quad (1)$$

since the second term is that portion of the series resistance produced by acoustic radiation the efficiency is simply this term divided by $R_T$, or $$\eta = \frac{R\omega^2 C^2}{\omega C_0 \tan \delta + R\omega^2 C^2} \quad (2)$$

Now, $R_L$ depends upon the specific acoustic impedance of the medium $(\rho v)$ and the dimensions of the transducer. At low frequencies, where the radius is considerably smaller than the wavelength, the expression for the real part of the mechanical radiation impedance is approximately $$R_L = 4\pi \rho a^4 \omega^2 / v \quad (3)$$

where $\rho$ is the density and $v$ is the sound velocity of the medium.

For a thin-shelled hollow sphere, the stiffness is approximately $$K = 8\pi b E'/1-\sigma \quad (4)$$

where $E'$ is Young's modulus of elasticity and $\sigma$ is Poisson's ratio. The modulus $E'$ is the short-circuit or zero-field modulus, and it is related to the open-circuit or zero-electric-displacement modulus $E$ by the relation $$E' = E(1 - k_c^2) \quad (5)$$

where $k_c$ is the electromechanical coupling coefficient. This may be expressed approximately by $$k_c^2 = C/(C + C_0) \quad (6)$$

For a thin-walled hollow sphere, the clamped capacity is approximately $$C_0 = \epsilon \epsilon_0 4\pi a^2 / b \quad (7)$$

where $\epsilon$ is the dielectric constant and $\epsilon_0$ is a constant whose value depends on the choice of units. Expressions involving Eqs. 3–6 and the electromechanical transformation ratio ($\alpha$) may be substituted in Eq. 2 as follows:

$$\eta = \frac{R\omega^2 C^2}{\omega C_0 \tan \delta + R\omega^2 C^2} \quad (2)$$

from FIG. 5, $$R = \frac{R_L}{\alpha^2} \text{ and } C = \frac{\alpha^2}{K}$$

therefore, $$R = \frac{R_L}{CK} \quad (2a)$$

and substituting (2a) in (2) gives:

$$\eta = \frac{R_L \omega C}{K C_0 \tan \delta + R_L \omega C} \quad (2b)$$

and substituting the right side of Equation 3 for $R_L$ gives:

$$\eta = \frac{4\pi \rho a^4 \omega^3 C}{v K C_0 \tan \delta + 4\pi \rho a^4 \omega^3 C} \quad (2c)$$

and substituting the right side of Equation 4 for $K$ gives:

$$\eta = \frac{\rho a^4 \omega^3 C (1-\delta)}{2vbE'C_0 \tan \delta + \rho a^4 \omega^3 C(1-\delta)} \quad (2d)$$

and substituting the right side of Equation 5 for $E'$ gives:

$$\eta = \frac{\rho a^4 \omega^3 C(1-\sigma)}{2vbE(1-k_c^2)C_0 \tan \delta + \rho a^4 \omega^3 C(1-\sigma)} \quad (2e)$$

and solving Equation 6 for $C_0$ $$k_c^2 = \frac{C}{C + C_0} \quad (6)$$

$$k_c^2(C + C_0) = C$$

gives:

$$C_0 = \frac{C(1 - k_c^2)}{k_c^2} \quad (6a)$$

and substituting the right side of (6a) for $C_0$ in Equation 2e gives the following expression for the efficiency, $$\eta = \frac{\rho \omega^3 a^4 (1-\sigma) k_c^2}{2vbE(1-k_c^2)^2 \tan \delta + \rho \omega^3 a^4 (1-\sigma) k_c^2} \quad (8)$$

It is now desired to obtain expressions for the free-field voltage response and the equivalent noise pressure in terms of these same parameters. As a consequence of the reciprocal properties of the transducer, the former is given by $$M_0 = \lambda \left( \frac{R_T \eta D}{\pi \rho v} \right)^{1/2} \quad (9)$$

where $\lambda$ is the wavelength of sound in the medium, and $D$ is the directivity factor which will be taken equal to unity for the assumed conditions.

It is usually necessary to amplify the low-level output of a hydrophone, and no matter how well an amplifier is designed, there still remains a residual output produced by thermal noise in the conductors of the input circuit. In the ideal case, this residual output will be due entirely to the hydrophone.

The open-circuit voltage in the hydrophone circuit developed by thermal agitation in a 1-c.p.s. band is given by $$V_N = (4kTR_T)^{1/2}$$

where $k =$ Boltzmann's constant and $T$ is the absolute temperature.

Now the equivalent noise pressure is defined as the equivalent acoustic pressure produced by sound energy, in a 1-c.p.s. band, that will generate an open-circuit voltage in the hydrophone just equal to that produced by the thermal noise at the same frequency and also for a 1-c.p.s. band. Since the sensitivity in Eq. 9 is $V/P$, where $V$ is the open-circuit voltage across the terminals of the hydrophone resulting from an acoustic pressure $P$, it is possible to solve for $V$ and equate this to the expression for the noise voltage above. Solving this equation for the pressure, we obtain the equivalent noise pressure $$P_t = \left( \frac{4kT\pi \rho v}{\lambda^2 \eta D} \right)^{1/2} \quad (10)$$

The desired expression for the equivalent noise pressure is obtained by substituting Eq. 8 in this expression. The result is $$P_t = \left\{ \frac{kT[2bE(1-k_c^2)^2 \tan \delta + \rho \omega^3 a^4 (1-\sigma) k_c^2 / v]}{\pi \omega a^4 (1-\sigma) k_c^2} \right\}^{1/2} \quad (11)$$

From Eq. 1, it is easily seen that the real part of the series impedance that is due to radiation is $$R_s = RC^2/(C + C_0)^2 \quad (12)$$

and this is simply the product of the total series resistance and the efficiency. This would be true even if the purely mechanical losses were not neglected. Therefore, substituting this expression for $R_T\eta$ in Eq. 9 and making use of Eqs. 3–7, the free-field voltage response becomes $$M_0 = \left( \frac{a^2(1-\sigma) k_c^2}{2E\epsilon \epsilon} \right)^{1/2} \quad (13)$$

The three quantities, $\eta$, $M_0$, and $P_t$, have also been obtained for other shapes of piezoelectric transducers: a hollow, thin-walled cylinder loaded radially and a flat, circular disk radiating off both flat circular faces. For these cases, the radiation resistance per unit area was assumed to be the same as that of a sphere having the same radiating area. Further, the length ($l$) and the diameter ($2a$) of the cylinder were assumed to be roughly the same order of magnitude. The results for the cylinder are as given below:

$$P_t = \left\{ \frac{kT[2bE \tan \delta (1-k_c^2)^2 + \rho \omega^3 a^3 l k_c^2 / v]}{\pi \omega a^3 l k_c^2} \right\}^{1/2}$$

Thus, as may be seen, the optimum equivalent noise pressure is obtained with a cylinder thickness as small as possible and the diameter as large as practical. In practice, a six inch O.D. cylinder was used, however, this dimension may be varied up to 36 inches without substantial variation of results.

This development clearly indicates the various parameters that determine the equivalent noise pressure of an electroacoustic transducer, which is a measure of the lowest acoustic signal that can be detected with an electroacoustic transducer used as a sound receiver. Although the principles apply to a transducer in any medium, the principal interest is in underwater sound receivers (hydrophones).

On the assumption that the hydrophone should have a constant free-field voltage response over a given frequency range and that it should be omnidirectional over this same frequency range, this invention indicates the manner in which the equivalent noise pressure depends upon the dimensions and the values of other transducer parameters.

These principles apply in a general way to all kinds of reciprocal electroacoustic transducers. Considering the hollow piezoelectric cylinder that radiates only on its outer cylindrical surface, it is seen that the equivalent noise pressure may be reduced by increasing the outer dimensions (diameter and length) and decreasing the wall thickness. In order that the hydrophone be omnidirectional for all sound frequencies to be detected, the outer dimensions should not exceed approximately one-half the wavelength of sound in the medium for any frequency in the band. Thus, the highest frequency that it is desired to measure will limit the magnitude of the outer dimensions. The wall thickness should be made as small as possible but it must be large enough to withstand the required hydrostatic pressure. This involves the compressive strength of the transducer material and requires that the material should be as strong as possible, yet compatible with other requirements.

The piezoelectric material chosen should have a low loss tangent (dissipation factor), a low modulus of elasticity, and a high electromechanical coupling coefficient. It is unlikely that any one material will possess all of these desirable features so a compromise must be made in order to achieve the best results. The electromechanical coupling coeffcient will depend upon the location of the electrodes and the directions of the electric polarization and electric driving field. Usually, there are two electrodes, one on the outer cylindrical surface and the other on the inner cylindrical surface. In this case, both the electrical polarization and the electric driving field are directed radially in the material. However, this does not provide the highest possible electromechanical coupling coefficient because the principal stresses are perpendicular to the direction of polarization and the electric driving field. A higher value of the electromechanical coupling coefficient is achieved if both the direction of electric polarization and the electric driving field are made circumferential or approximately circumferential which is the direction of the principal stress. This is achieved by longitudinal electrodes in the form of stripes.

In order to measure or record low level acoustic signals, it is necessary to first amplify these signals. It is usually the case that the background noise of the hydrophone-amplifier system is due to the amplifier rather than the hydrophone. In this case, the signal-to-noise ratio of the system may be improved by increasing the sensitivity of the hydrophone and feeding its output into an amplifier with a high impedance input.

A second feature of this invention concerns the relationship between sensitivity and transducer impedance. The particular model that was constructed and tested consists of four ceramic ferroelectric cylindrical elements coaxially mounted. These are connected in series, which provides a sensitivity (free-field voltage response) that is four times (16 db greater) as great as if they were parallel-connected or consisted of a single cylinder with the same overall size. Constructing the transducer of a still larger number of cylinders and connecting them in series will further increase the sensitivity; that is, one might divide each of the cylinders into two, three, or more parts. This same result may be achieved without a large number of individual elements simply by dividing the electrodes of each cylinder into parts in a similar manner and connecting these in series.

The capacity of a thin-walled cylinder that has its two electrodes on the cylindrical surfaces is given approximately by $$C = \frac{\epsilon \epsilon_0 \pi d_m l}{b}$$

where $\epsilon$ is the dielectric constant, $\epsilon_0$ is a constant whose value depends upon the choice of units, $d_m$ is the mean diameter, $l$ is the length or height, and $b$ is the wall thickness. If now the cylinder is divided into N cylinders, all of equal length, and these are connected in series, the capacity of the series combination is $$C_N = \frac{\epsilon \epsilon_0 \pi d_m l}{b N^2}$$

Since the impedance is inversely proportional to the capacity, it is seen that the impedance of N series connected cylinders is $N^2$ times that of the whole cylinder that has a single pair of electrodes. And since the sensitivity varies as the square root of the impedance, the sensitivity of the N parts, series-connected, will be N times as great. Thus, breaking up a cylinder into N equal parts that are then series-connected, increases the sensitivity level (free-field voltage response) by $20 \log N$.

It should be noted, however, that this manner of dividing up into smaller parts that are series-connected, produces a corresponding increase in the impedance but not in the equivalent noise pressure, provided we are considering transducers with the same overall dimension. The important point is that the above provides a means of adjusting the sensitivity and the impedance in order to adjust the latter to be more compatible with that of the amplifier input with the object of obtaining the highest possible signal-to-noise ratio for the hydrophone-amplifier system.

A second means of adjusting the impedance is to employ a number of longitudinal stripes for electrodes previously described. The maximum impedance and consequently the highest sensitivity is achieved with only two electrodes. However, the addition of any greater number of electrodes provides a very versatile means of adjusting the impedance over a wide range of values. As previously stated, this also provides a high coupling coefficient because the electric polarization, electric driving field, and principal stress all have the same direction.

If the cylinder is provided with N striped electrodes and polarized circumferentially as shown in the figure above, the capacity is given approximately by $$C_N = \frac{\epsilon \epsilon_0 l b N^2}{\pi d_m}$$

where $\epsilon$ is the dielectric constant, $\epsilon_0$ is a constant whose value depends upon the choice of units, $d_m$ is the mean diameter, l is the length, and $b$ is the wall thickness (assumed small compared with the diameter).

The value N cannot be smaller than 2 and cannot be allowed to increase to very large values because the polarization in the vicinity of the electrodes is incomplete and imperfect. This is of no great consequence because it is usually desirable to increase rather than decrease the impedance and this is accomplished by using a small number of electrodes.

The impedance and sensitivity of the piezoelectric disk are very easy to adjust over wide ranges of values. This is accomplished very simply by constructing the disk of a number of thinner disks that are polarized and electroded as shown below.

Since these sections are parallel-connected, the impedance is just $1/N^2$ times that which would be obtained for the disk as a whole, that is, with one electrode at the top and one at the bottom.

The discussion has concerned itself primarily with piezoelectric transducers. However, most of these principles apply equally well to any electric-coupled transducer and to some extent to magnetic-coupled, such as magnetostrictive or electrodynamic. The dependence of equivalent noise pressure on size and wall thickness will essentially be the same for all types. The discussion of the relationships existing for equivalent noise pressure, free-field voltage response and impedance is also applicable. In fact, the impedance and sensitivity for magnetic coupled transducers are more easily adjusted, simply by varying the number of turns of wire in the driving coil.

What is claimed is:

An omnidirectional piezoelectric hydrophone responsive to incident vibrations comprising, in combination: A plurality of ferroelectric ceramic cylindrical rings coaxially mounted, having an outer cylindrical surface and an inner cylindrical surface, said rings having a mean radius $a$, a wall thickness $b$, and a length $l$ correlated by the formula $$P_t^2 = \frac{kT[2bE \tan \delta (1-k_c^2)^2 + \rho \omega^3 a^3 l k_c^2/v]}{\pi \omega a^3 l k_c^2}$$

where:
$P_t$=equivalent noise pressure
$k$=Boltzmann's constant
$T$=absolute temperature
$b$=wall thickness
$E$=modulus of elasticity (open circuit)
$\tan \delta$=loss tangent
$k_o$=electromechanical coupling coefficient
$\rho$=density of the medium
$\omega=2\pi f$
$a$=mean radius of the cylindrical rings
$l$=length of cylindrical rings
$v$=sound velocity of medium wherein $b$ is selected to be as small as structurally practical and $a$ and $l$ are selected to be as large as structurally practical, limited only by the ambient pressure to be imposed by the medium in which said hydrophone is to be utilized; and said cylindrical rings being exposed to said vibrations on said outer cylindrical surface and shielded from said vibrations on said inner cylindrical surface.

References Cited by the Examiner

UNITED STATES PATENTS

| | | |
|---|---|---|
| 2,396,519 | 3/1946 | Massa. |
| 2,638,577 | 5/1953 | Harris _____ 340—10 |
| 2,760,181 | 8/1956 | Camp _____ 340—10 |
| 2,787,777 | 4/1957 | Camp _____ 340—10 |
| 3,043,967 | 7/1962 | Clearwaters. |
| 3,090,939 | 5/1963 | Massa _____ 340—9 |

CHESTER L. JUSTUS, *Primary Examiner.*

J. W. MILLS, J. MORRIS, *Assistant Examiners.*